United States Patent
Yamamoto et al.

(10) Patent No.: US 8,205,707 B2
(45) Date of Patent: *Jun. 26, 2012

(54) ARRANGEMENT STRUCTURE OF INCLINATION ANGLE SENSOR

(75) Inventors: Takao Yamamoto, Saitama (JP); Shigeto Inami, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 12/823,992

(22) Filed: Jun. 25, 2010

(65) Prior Publication Data
US 2010/0258373 A1     Oct. 14, 2010

Related U.S. Application Data

(63) Continuation of application No. 11/510,588, filed on Aug. 28, 2006, now Pat. No. 7,882,923.

(30) Foreign Application Priority Data

Aug. 31, 2005  (JP) .................................. 2005-252863

(51) Int. Cl.
*B60K 28/14* (2006.01)

(52) U.S. Cl. ........................................ 180/283; 280/735

(58) Field of Classification Search ................... 180/282, 180/311; 280/735
See application file for complete search history.

(56) References Cited

U.S. PATENT DOCUMENTS

| | | | | |
|---|---|---|---|---|
| 4,687,069 A * | 8/1987 | Inomata et al. | ............... | 180/68.2 |
| 6,104,099 A * | 8/2000 | Mizuta et al. | ................... | 307/9.1 |
| 6,289,866 B1 * | 9/2001 | Tsuruta et al. | ............ | 123/198 E |
| 6,527,077 B2 * | 3/2003 | Yamamoto et al. | ........... | 180/283 |
| 7,017,701 B2 * | 3/2006 | Flynn et al. | .................... | 180/282 |
| 7,143,853 B1 * | 12/2006 | Mercier et al. | ................ | 180/210 |
| 2002/0027037 A1 * | 3/2002 | Yamamoto et al. | ........... | 180/283 |
| 2004/0080186 A1 | 4/2004 | Crepeau et al. | | |
| 2005/0161274 A1 * | 7/2005 | Tsuruta | ........................ | 180/282 |

FOREIGN PATENT DOCUMENTS

| | | |
|---|---|---|
| JP | 11-216211 A | 8/1999 |
| JP | 2000-313386 A | 11/2000 |
| JP | 2005-178420 A | 7/2005 |

* cited by examiner

*Primary Examiner* — Paul N Dickson
*Assistant Examiner* — Timothy Wilhelm
(74) *Attorney, Agent, or Firm* — Birch, Stewart, Kolasch & Birch, LLP

(57) ABSTRACT

In a vehicle of a type which does not bank a vehicle body at the time of turning, an inclination angle sensor is provided which receives the least influence of a centrifugal force at the time of turning. In a four-wheeled buggy that includes a vehicle body frame, four longitudinal wheels including front wheels and rear wheels are provided together with an engine, a fuel tank and a fuel pump. A steering shaft is connected to a steering handle with an inclination angle sensor arranged above a seat and being positioned in front of the steering shaft. Accordingly, the inclination angle sensor is hardly influenced by a centrifugal force at the time of turning.

20 Claims, 6 Drawing Sheets

ARRANGEMENT STRUCTURE OF INCLINATION ANGLE SENSOR

CROSS-REFERENCE TO RELATED APPLICATIONS

The present application is a continuation of U.S. patent application Ser. No. 11/510,588 filed on Aug. 28, 2006 now U.S. Pat. No. 7,882,923, and claims priority under 35 USC 119 to Japanese Patent Application No. 2005-252863 filed on Aug. 31, 2005, the entire contents of which are hereby incorporated by reference.

BACKGROUND OF THE INVENTION

1. Field of the Invention

The present invention relates to an arrangement structure of an inclination angle sensor which is suitably applicable to a vehicle of a type which turns a vehicle body of a four-wheeled buggy while preventing the vehicle body from banking.

2. Description of Background Art

A vehicle is known that includes an inclination angle sensor for detecting an inclination of a vehicle body in the lateral direction for stopping an engine. In a vehicle of a type which turns the vehicle body without banking the vehicle body, the inclination angle sensor is liable to be easily influenced by a centrifugal force during turning. Thus, an inclination angle sensor is known which is arranged in the vicinity of the center of the turning to avoid the influence of the centrifugal force. See, JP-A-2005-178420.

In the above-mentioned conventional example, the center of turning in the vehicle is considered to be positioned above an axis of the left and right front wheels and the inclination angle sensor is positioned in the vicinity of the center of turning of the vehicle body. Thus, a recessed portion is formed in a front end of a fuel tank and the inclination angle sensor is arranged in the recessed portion.

However, in this case, to mount the inclination angle sensor, it is necessary to change a shape of the fuel tank. Further, it is necessary to change the fuel tank for each type of vehicle.

Further, it is desirable that the inclination angle sensor is arranged in the vicinity of or close to the center of turning thus reducing the influence of a centrifugal force.

SUMMARY AND OBJECTS OF THE INVENTION

Accordingly, it is an object of the present invention to arrange the inclination angle sensor closer to the vicinity of the center of turning without requiring a large change with respect to vehicle body constitutional parts.

To overcome the above-mentioned drawback, according to an embodiment of the present invention an arrangement structure of an inclination angle sensor is directed to a vehicle which includes a frame with at least three wheels which are supported on the frame. A steering shaft is connected to a steering handle. The vehicle includes an inclination angle sensor wherein the inclination angle sensor is arranged above a seat and, at the same time, in front of the steering shaft and above an axis of a front wheel.

According to an embodiment of the present invention, a radiator is provided with a reservoir tank being arranged behind the radiator. The inclination angle sensor is arranged behind the reservoir tank.

According to an embodiment of the present invention, the inclination angle sensor is mounted on a cross member which is arranged to extend between left and right sides of a vehicle body frame and supports an upper end of a front shock absorber of a front-wheel suspension.

According to an embodiment of the present invention, the inclination angle sensor is arranged in front of the steering shaft, above and in the vicinity of the axis of the front wheels, and behind the upper portion of the radiator.

The four-wheeled buggy is basically a vehicle aimed for traveling on an irregular ground. Hence, according to an embodiment of the present invention, a radiator is mounted at a higher position with respect to the ground whereby, According to an embodiment of the present invention, the inclination angle sensor is positioned behind the axis of the front wheel.

According to an embodiment of the present invention, the inclination angle sensor is arranged behind the radiator in a spaced-apart manner.

According to an embodiment of the present invention, by connecting an electric wire (harness) to supply a detection signal, or the like, of the inclination angle sensor to the upper portion of the inclination angle sensor, it is possible to connect the electric wire to the inclination angle sensor from above.

According to an embodiment of the present invention, both side portions of the casing are fixed to the cross member using the bolts.

According to an embodiment of the present invention, the inclination angle sensor is offset to one side of the vehicle body. Further, the inclination angle sensor is arranged below the upper end of the cross member, so that when the electric wire of the inclination angle sensor is connected to the inclination angle sensor from above, the electric wire can be routed around with tolerance.

In a vehicle that includes at least three wheels, the wheels are allowed to slide and turn while preventing the vehicle body from banking at the time of turning. Thus, a centrifugal force which is generated during such turning affects the inclination angle sensor. However, the inclination angle sensor of the present invention is arranged in front of the steering shaft and above the axis of the front wheel. "Thus, the inclination angle sensor is arranged closer to the vicinity of the center of turning of the vehicle body. Accordingly, the inclination angle sensor is arranged at a position where at least a centrifugal force is applied to the inclination angle sensor at the time of turning the vehicle. Thus, the influence of the centrifugal force can be reduced. Further, it is possible to arrange the inclination angle sensor without requiring a change of other vehicle body constitutional part which requires a particular mounting part.

According to an embodiment of the present invention, the reservoir tank of the radiator is provided behind the radiator and the inclination angle sensor is arranged behind the reservoir tank. Thus, it is possible to arrange the inclination angle sensor at a position where the inclination angle sensor hardly receives any thermal damage from the radiator.

According to an embodiment of the present invention, the inclination angle sensor is mounted on the cross member which supports the upper end of the front shock absorber. Thus, it is unnecessary to prepare particular mounting parts whereby the number of parts can be reduced and, at the same time, the change of other vehicle-body constitutional parts becomes unnecessary.

Further, by mounting the inclination angle sensor on the cross member which supports the upper end of the front shock absorber, it is possible to arrange the inclination angle sensor above an axis of the front wheel as viewed in a side view.

Thus, it is possible to arrange the inclination angle sensor closer to the vicinity of the center of turning of the vehicle body.

According to an embodiment of the present invention, since the inclination angle sensor is arranged in front of the steering shaft, above and in the vicinity of the axis of the front wheels, and behind the upper portion of the radiator, it is possible to arrange the inclination angle sensor at a position where the inclination angle sensor is hardly influenced by a centrifugal force, and at a position where the inclination angle sensor hardly receives any thermal damage from the radiator.

The four-wheeled buggy is basically a vehicle aimed for traveling on an irregular ground. Hence, a radiator is mounted at a higher position with respect to the ground whereby, by mounting the inclination angle sensor behind the upper portion of the radiator, the inclination angle sensor is positioned at a higher position. Accordingly, in addition to an advantageous effect that the detection of the inclination angle of the vehicle body is further enhanced, the inclination angle sensor is only minimally influenced by soil or mud due to the upward separation of the inclination angle sensor from the front wheels. Thus, it is possible to arrange the inclination angle sensor at the best position suitable for detecting the inclination angle and is hardly damaged from the outside.

According to an embodiment of the present invention, since the inclination angle sensor is positioned behind the axis of the front wheel, even when a front portion of the vehicle is damaged during traveling on the irregular group by a chance, provided that the damage does not arrive at the front wheel, the damage does not arrive at the inclination angle sensor.

According to an embodiment of the present invention, the inclination angle sensor is arranged behind the radiator in a spaced-apart manner, it is possible to arrange the inclination angle sensor at a position where the inclination angle sensor hardly receives any thermal damage from the radiator.

According to an embodiment of the present invention, by connecting an electric wire (harness) to supply a detection signal, or the like, of the inclination angle sensor to the upper portion of the inclination angle sensor, it is possible to connect the electric wire to the inclination angle sensor from above. Thus, it is possible to prevent the intrusion of rainwater or the like into the electric wire.

According to an embodiment of the present invention, both side portions of the casing are fixed to the cross member using the bolts. Hence, it is possible to horizontally fix the inclination angle sensor to the cross member, thus enabling the detection of an accurate inclination angle.

Further, it is possible to easily connect the electric line to the upper portion of the inclination angle sensor.

According to an embodiment of the present invention, by arranging the inclination angle sensor such that the inclination angle sensor is offset to one side of the vehicle body, maintainability such as the removal of the inclination angle sensor or the like is enhanced. Further, by arranging the inclination angle sensor below the upper end of the cross member, when the electric wire of the inclination angle sensor is connected to the inclination angle sensor from above, the electric wire can be routed around with tolerance. Hence, it is possible to prevent an external force from being applied to the electric wire.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, an embodiment of the present invention is explained in conjunction with drawings. Here, directions such as front, rear, left and right in the following explanation are based on the directions of a vehicle in use unless otherwise specified.

Figure 1:
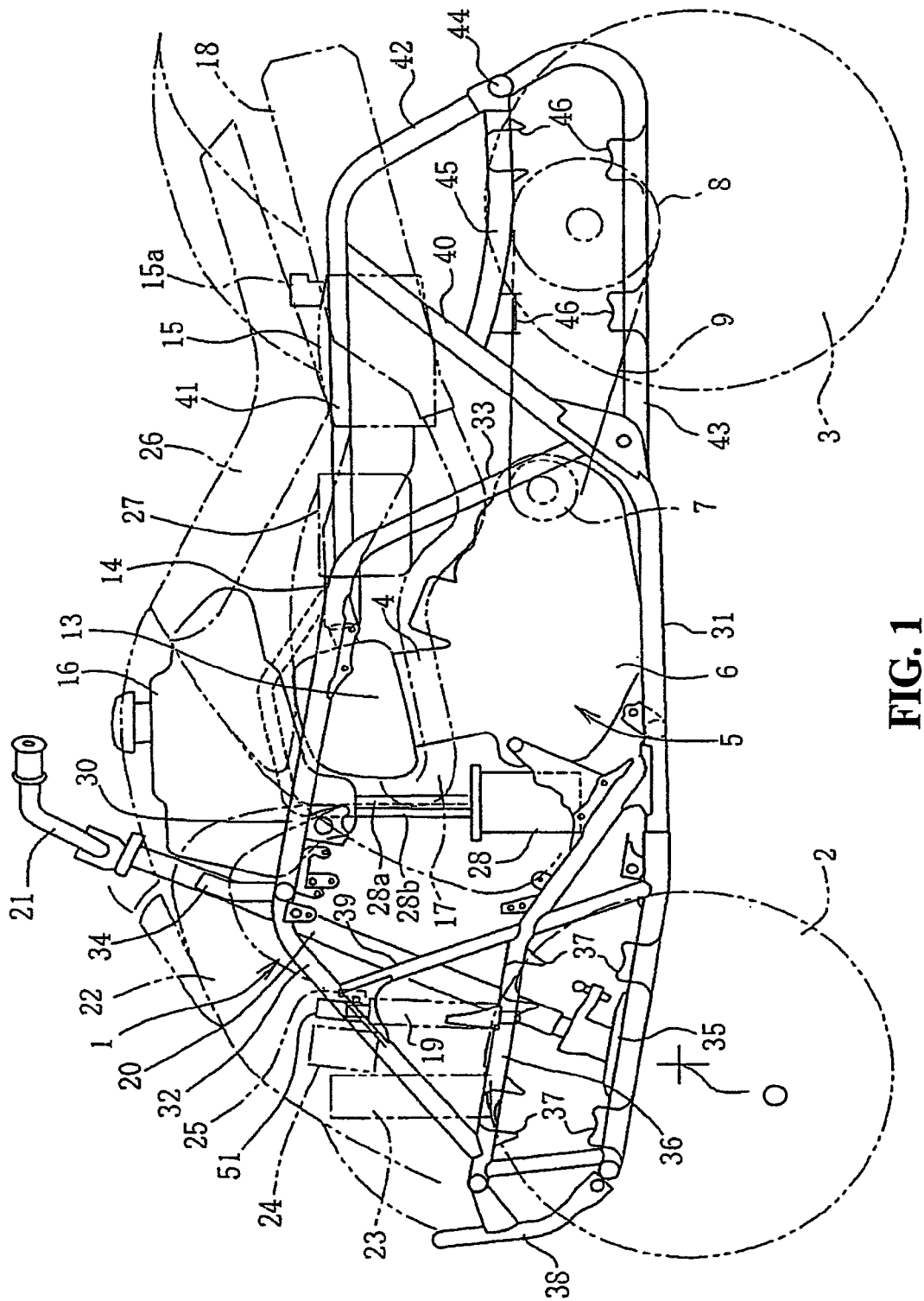
FIG. 1 is a side view of a four-wheeled buggy according to an embodiment.

FIG. 1 is a left side view of a four-wheeled buggy according to the embodiment. The four-wheeled buggy is a saddle-riding-type vehicle for traveling on irregular ground. The vehicle includes a pair of left and right front wheels 2 and a pair of left and right rear wheels 3 which are low pressure balloon tires having relatively large diameters arranged on front and rear portions of the vehicle body frame 1 thus ensuring a large minimum ground height for enhancing the operational ability mainly on irregular ground.

At an approximately center position of the vehicle body frame 1, an engine 5 is mounted which includes a forwardly inclined cylinder 4. The engine 5 is a water-cooling type single-cylinder engine. A crankcase 6 which forms a lower portion of the engine 5 also functions as a transmission case, and a chain 9 extends between and is wound around an output sprocket wheel 7 which is formed on a rear portion of the crankcase 6 with a driven sprocket wheel 8 being provided on the rear-wheel side whereby the rear wheels 3 are driven by the chain.

The rear wheels 3 are suspended to a rear portion of the vehicle body using a double wishbone method.

Supplying of a mixed gas to a cylinder head 13 of the engine 5 is performed from a throttle body 14 which is arranged behind the cylinder head 13. The throttle body 14 includes an injector (omitted from the drawing, see FIG. 2) which injects fuel to the inside of an intake passage by an electric control and, at the same time, introduces outside air therein from an air cleaner 15 which is arranged behind the throttle body 14. Fuel is supplied from a fuel tank 16 which is arranged above the cylinder head 13 by way of a fuel pump (described later).

Further, a proximal end portion of an exhaust pipe 17 is connected to a front portion of the cylinder head 13, and the exhaust pipe 17 extends along one side of the cylinder head 13 and is connected to a muffler 18 which is arranged on a rear portion of the vehicle body.

A steering shaft 20 is mounted on a front portion of the vehicle body and is rotated by a handle 21 arranged on an upper end portion thereof. The steering shaft 20 is arranged obliquely in the upward and rearward direction with a lower end portion thereof forming a center of turning. The steering shaft 20 is positioned in the vicinity of the center of the front wheel 2 as viewed in a side view. At the time of turning, the left and right front wheels 2 are steered by a rotation of the steering shaft 20 using a conventional steering mechanism.

A front portion of the steering shaft 20 is covered with a front cover 22 made of resin. On the inside of the front cover 22, from the front side, a radiator 23 is provided for cooling the engine. A reservoir tank 24 of the radiator 23 are arranged in this order. Further, an inclination angle sensor 25 is arranged behind the reservoir tank 24. The inclination angle sensor 25 is arranged in a state wherein the inclination angle sensor 25 is concealed by the back surface of the reservoir tank 24 as viewed in a front view.

An air cleaner 15 is arranged below a rear-side portion of a seat 26 behind the lowest portion of the seat 26 with a snorkel 15a extending upwardly from a rear portion of the air cleaner 15 and an opening formed on an upper end portion of the snorkel 15a projects up to a relatively high position below the seat 26. A battery case 27 is arranged between the air cleaner 15 and the throttle body 14. A fuel pump 28 is arranged below the fuel tank 16 and in front of the engine 5.

A fuel intake port formed in an upper portion of the fuel pump 28 and a fuel takeout port formed in a bottom portion of the fuel tank 16 are connected by way of a communication pipe 28a in a straight manner with a short distance therebetween. On the other hand, a fuel discharge port of the fuel pump 28 and an injector of the throttle body 14 are connected by way of a fuel supply pipe 28b. The fuel supply pipe 28b extends upwardly from the fuel discharge port which is arranged in an upper portion of the fuel pump 28 and is thereafter bent toward a rear portion and extends rearwardly to arrive at the injector.

When the fuel pump 28 is operated, the fuel sucked from the fuel tank 16 is pressurized to a predetermined fuel pressure and is thereafter supplied to the injector by way of the fuel supply pipe 28b. The fuel is injected by the operation of the injector thus being supplied to the cylinder head 13 together with the outside air which is introduced from the air cleaner 15.

The vehicle body frame 1 includes an upper frame 30 and a lower frame 31 which are arranged longitudinally to be approximately parallel to each other. The front down frames 32 are arranged obliquely in the frontward and downward direction by bending a front portion of the upper frame 30 with a rear down frame 33 which is arranged obliquely in the rearward and downward direction by bending a rear portion of the upper frame 30 and extends through the engine 5. The frames are contiguously formed in a closed-loop as viewed in a side view.

In the vicinity of a connection portion between a front end portion of the upper frame 30 and an upper portion of the front down frames 32, an upper bracket 34, which supports an upper portion of the steering shaft 20, is formed. A lower bracket 35 supports a lower end portion of the steering shaft 20 and is supported on the lower frame 31 at the vehicle body center.

A reinforcing pipe 36 is formed obliquely in the frontward and upward direction between a lower portion of the front down frames 32 and a front portion of the lower frame 31 thus forming a triangular reinforcing portion on a front lower portion of the vehicle body frame 1. A stay 37, which supports an arm member for a double wishbone type front wheel suspension device, is formed on the reinforcing portion. A front protector 38 is provided that is mainly made of a steel pipe.

A reinforcing pipe 39 is provided for connecting an intermediate portion of the front down frames 32 and a front portion of the lower frame 31. An upper end portion of the front shock absorber 19 of the front wheel suspension device is supported on a cross member 51 (described later) which is formed on an intermediate portion of the front down frames 32 which is arranged in the vicinity of an upper end portion of the reinforcing pipe 39. The upper end portion of the front shock absorber 19 is positioned above an axis O of the front wheels 2 as viewed in a side view. The axis O corresponds to the center of an axle of the front wheels.

A rear portion of the lower frame 31 is bent in the vicinity of a lower end portion of the rear down frame 33 to form a rear frame 40 which extends obliquely in the upward and rearward direction. A rear portion of the rear frame 40 is connected to a longitudinally intermediate portion of a seat rail 41 which extends rearwardly and approximately horizontally from the vicinity of a connection portion of a rear end portion of the upper frame 30 and the rear down frame 33.

The seat rail 41 includes an overhang portion 42 which extends further rearwardly from a portion to which an upper end portion of the rear frame 40 is connected. Thereafter, the seat rail 41 is bent obliquely in the downward direction. The overhang portion 42 is formed and is connected to a rear end of a rearward extending portion 43 of the lower frame 31.

The rearward extending portion 43 extends rearwardly from the vicinity of the connection portion of a rear portion of the lower frame 31 and the rear frame 40, while a rear end portion of the rearward extending portion 43 is bent upwardly and is connected with a lower end of the overhang portion 42 by way of a connection portion 44. A reinforcing portion pipe 45 is connected between a vertically intermediate portion of the rear frame 40 and the connection portion 44 and is arranged above the rearward extending portion 43 approximately parallel to the rearward extending portion 43. The reinforcing pipe 45 and the rearward extending portion 43 support the arm member for double wishbone type rear wheel suspension device and include a stay 46 provided for this purpose.

Figure 2:
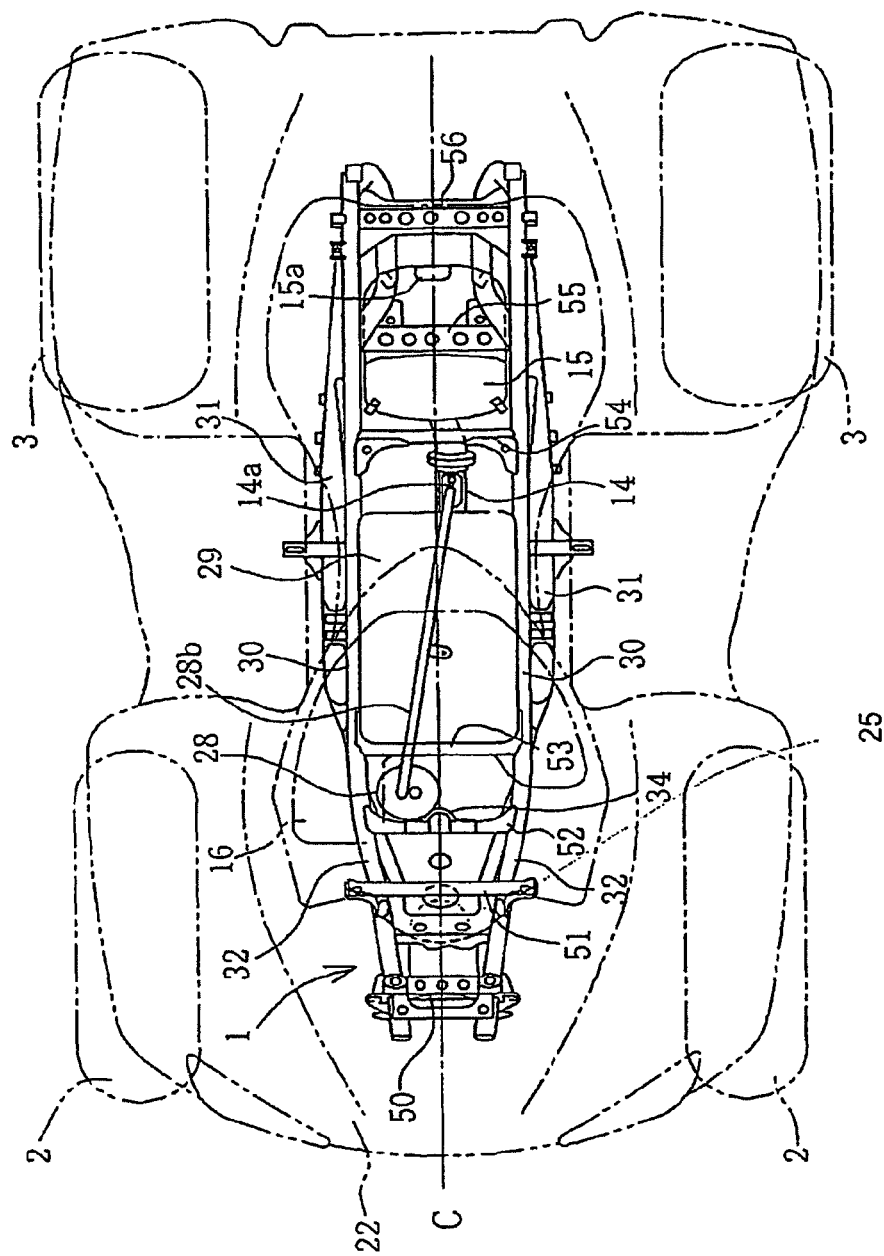
FIG. 2 is a plan view of the four-wheeled buggy according to the embodiment.

FIG. 2 is a plan view of the vehicle body frames 1. The above-mentioned vehicle body frames 1, as viewed in a plan view, are configured such that a pair of left and right vehicle body frames 1 are arranged while sandwiching a vehicle body center C therebetween and left and right portions of the vehicle body frame 1 are connected by cross members 50 to 56 thus forming an integral body as a whole. The members which constitute the vehicle body frame 1 are made of a steel pipe or the like.

Here, although omitted from this drawing, the steering shaft 20 is overlapped to the vehicle body center C.

Further, the inclination angle sensor 25 is also positioned on the vehicle body center. The inclination angle sensor 25 is used for detecting that the inclination of the vehicle body reaches a predetermined angle.

A heat blocking cover 29 is arranged between the fuel tank 16 and the engine 5. Above the heat blocking cover 29, the fuel supply pipe 28b is longitudinally arranged and a rear end portion of the fuel supply pipe 28b is connected to an injector 14a of the throttle body 14. The fuel supply pipe 29b is fixed to the heat shielding cover 29 at suitable positions using clamps.

Figure 3:
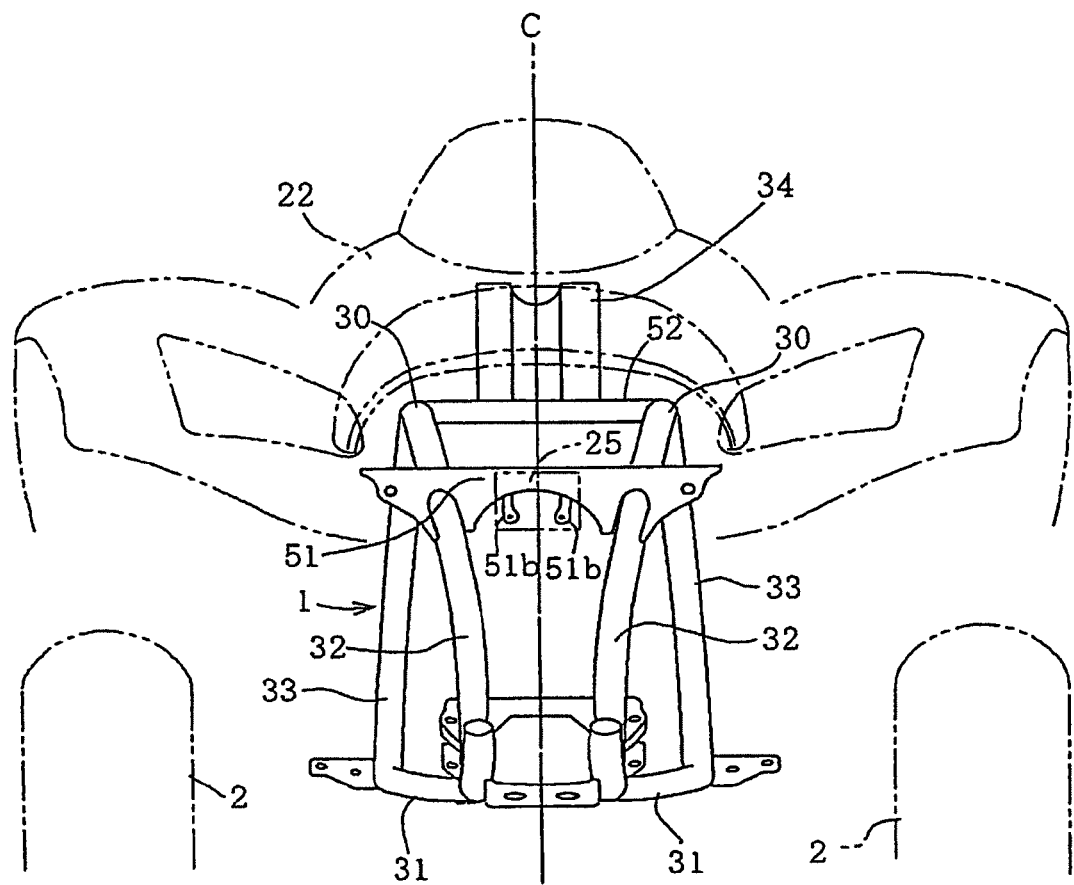
FIG. 3 is a front view of the four-wheeled buggy according to the embodiment.

FIG. 3 is a front view of the vehicle body frame 1, wherein on a front portion of the vehicle body, the upper bracket 34, which projects upwardly from the cross member 51 which extends between the left and right upper frames 30, is mounted such that the upper bracket 34 is arranged above the vehicle body center C. The inclination angle sensor 25 is provided for mounting the front shock absorber 19 (FIG. 1) of the front wheel suspension device and is supported on a center portion of the cross member 51 in the lateral direction which traverses the left and right front down frames 32 and is positioned on the vehicle body center C. This position of the inclination angle sensor 25 is arranged on the vehicle body center, in front of the steering shaft 20 and above the axis O of the front wheels 2 as viewed in a side view. Accordingly, the inclination angle sensor 25 is positioned close to the vicinity of the center of turning of the vehicle body.

Figure 4:
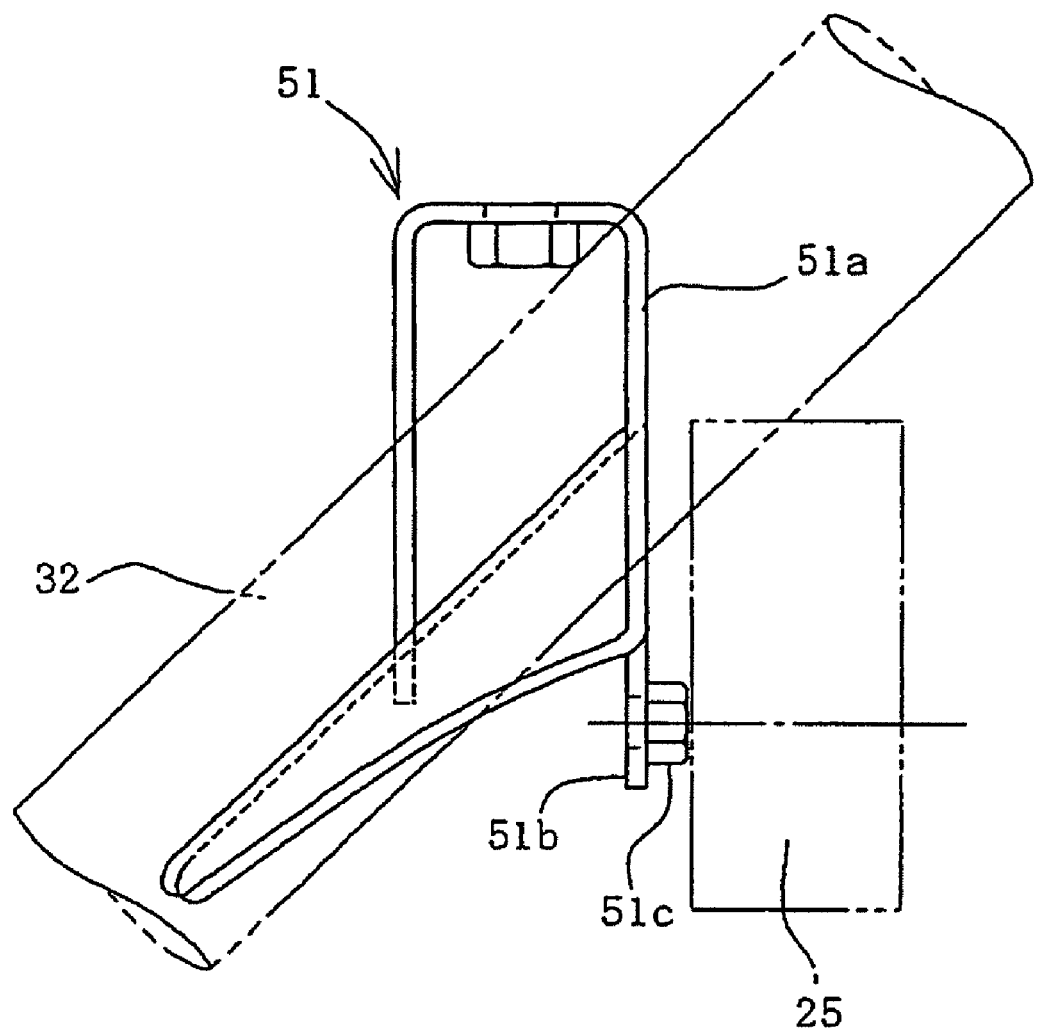
FIG. 4 is a view showing a mounting portion of an inclination angle sensor.

FIG. 4 is an enlarged side view of the cross member 51, wherein the cross member 51 has an approximately inverse U-shape as viewed in a side view and is raised upwardly from the front down frames 32. Further, the cross member 51 has a lower portion thereof welded to an outer peripheral portion of the front down frames 32. A lower end portion of a back portion 51a of the cross member 51 forms a downward projection portion 51b at a lateral center portion thereof and a nut 51c is welded to the downward projecting portion 51b. By mounting the inclination angle sensor 25 on the nut 51c, the inclination angle sensor 25 can be supported at the vehicle body center.

Figure 5:
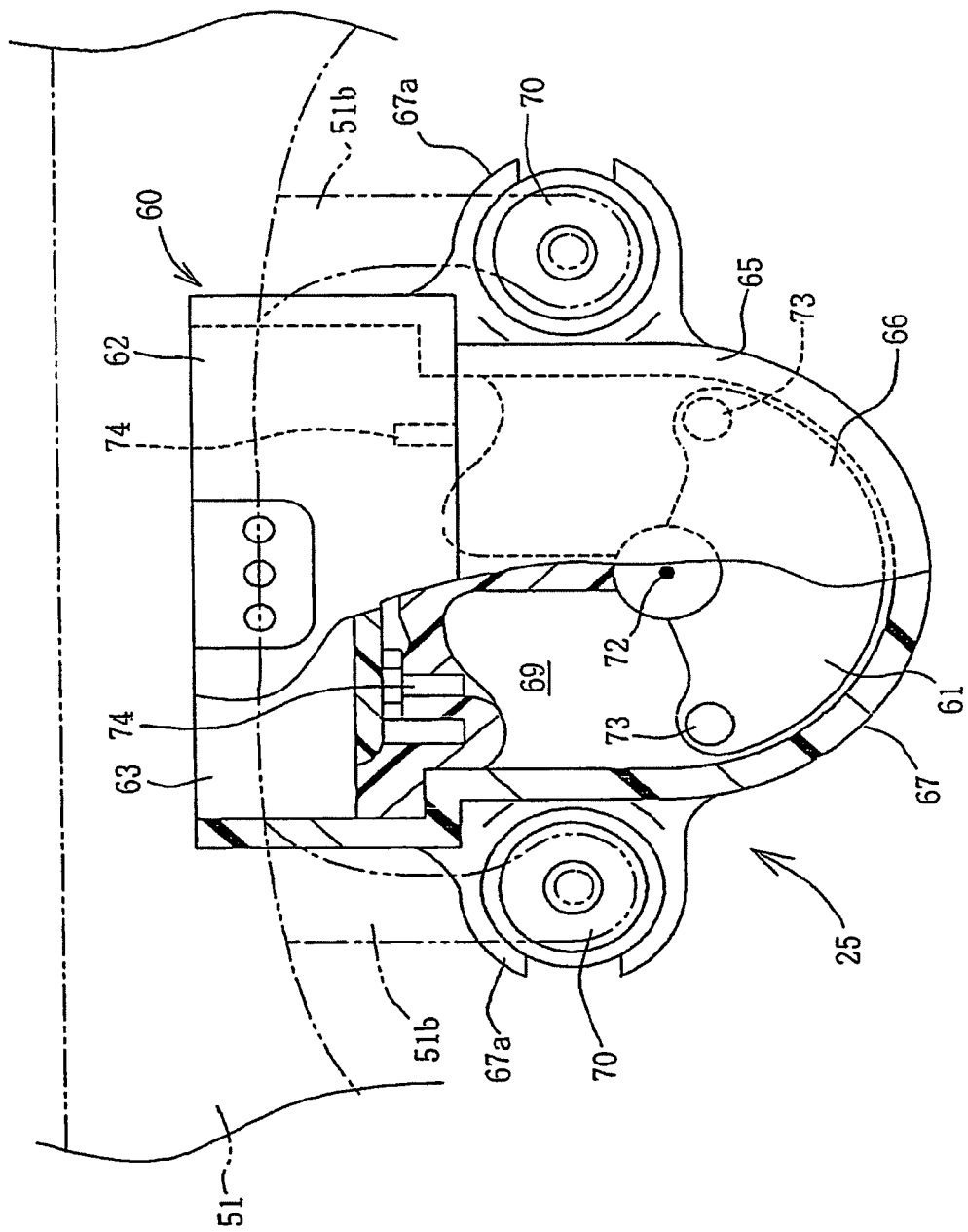
FIG. 5 is a front view of the inclination angle sensor.
Figure 6:
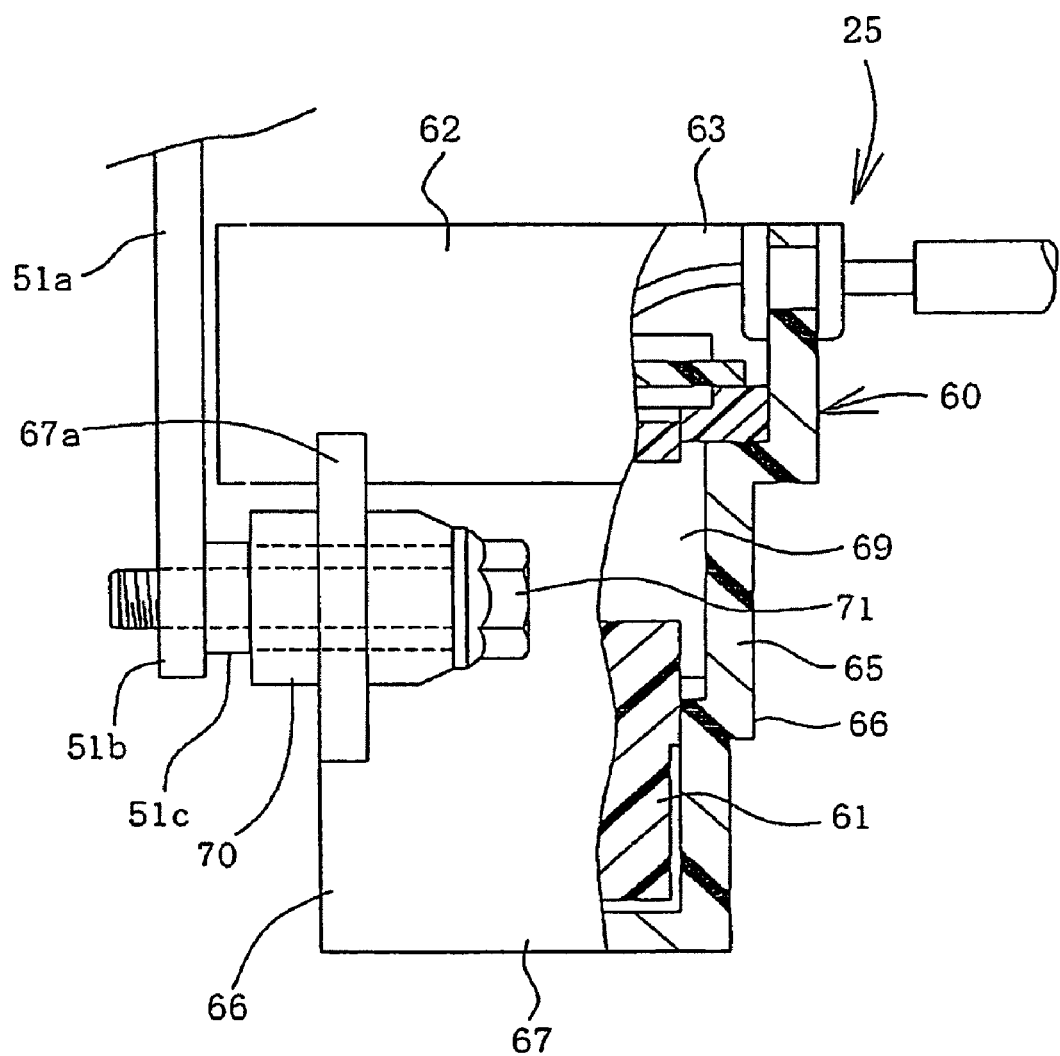
FIG. 6 is a side view of the inclination angle sensor.

As shown in FIGS. 5 and 6, the inclination angle sensor 25 includes an acceleration sensor which includes a float 61 as a pendulum in the inside of a casing 60. The casing 60 accommodates a detection circuit 63 in the inside of a box portion 62 which forms an upper portion of the casing 60, while the float 61 is accommodated in the inside of a space forming portion 65 which forms the lower portion of the casing 60.

The space forming portion 65 has a vessel-like shape with an upper portion thereof open-ended and includes front and rear wall portions 66, 66 which form a U-shaped profile as viewed in a front view (front surface view) and an outer peripheral wall portion 67 which connects outer peripheries of the front and rear wall portions 66, 66 thus forming an accommodating space 69 therein. Rubber mounts 70 are mounted on mounting projection portions 67a which are formed on both side portions of the casing 60, while the mounting projection portions 67a are mounted on nuts 51c of the cross member 51 by using bolts 71 (FIG. 6) here with a vibration damping effect.

The float 61 is a member having a semicircular shape which is pivotally mounted on a swinging shaft 72 at the approximate center in the inside of the accommodating space 69 and is swingably supported on the casing 60, wherein the pivotally mounting portion functions as a swinging fulcrum. A lower portion of the outer peripheral wall portion 67 has an arcuate shape which corresponds to an arcuate portion of the float 61. Damper oil for reducing the swinging movement of the float 61 is filled in the inside of the accommodating space 69.

A magnet 73 is embedded in left and right end portions of the float 61 and magnetic sensors 74 are formed on the left and right sides of an upper end portion of the float 61 in the inside of the accommodating space 69. When the float 61 reaches a predetermined swinging angle, the magnetic sensor 74 detects a magnetism of the approaching magnet 73. Thus, it is possible to detect that the vehicle body is inclined up to a predetermined angle.

The swinging shaft 72 of the float 61 is arranged parallel to the longitudinal direction of the vehicle body. However, by adjusting the position of the center of gravity of the float 61 or the like, in addition to a case wherein the vehicle body is inclined in the lateral direction and even in a case wherein the vehicle body is inclined in the longitudinal direction, the float 61 is allowed to swing. Hereinafter, it is assumed that when the vehicle body is in a state wherein the longitudinal and lateral inclinations are set to 0° (upright state) and only gravity acts as a force on the float 61, the float 61 is positioned at a neutral position of a swinging range in the accommodating space 69.

When the vehicle body is inclined in the longitudinal or lateral direction, the float 61 swings with respect to the casing 60. When the swinging of the float 61 reaches a predetermined angle, based on a detection signal of the magnetic sensor 74, the detection circuit 63 judges whether the swinging of the vehicle body reaches a predetermined angle or not. When it is judged that the vehicle body is inclined by the predetermined angle, by way of ECU (omitted to be shown in the drawing), a predetermined engine control such as an ignition cut or a fuel injection cut is performed.

The four-wheeled buggy according to this embodiment does not turn the vehicle body by banking as in a motorcycle. Thus, even when the vehicle body is in a substantially upright state by the action such as a centrifugal force or the like during a turning operation, there arises a case wherein the float 61 of the inclination angle sensor 25 swings. To cope with such a situation, a detection angle of the inclination angle sensor 25 of the present invention is set larger than the detection angle of the inclination angle sensor 25 used in a motorcycle. Here, the detection angle means a swinging angle from a neutral position of the float in detecting the predetermined inclination angle of the vehicle body.

Further, in the inclination angle sensor 25, a delay time is provided until the detection circuit 63 detects the inclination angle of the vehicle body thus preventing the inclination angle sensor 25 from misjudging that the inclination of the vehicle body reaches the predetermined angle when the float 61 largely swings and temporarily reaches the detecting angle at the time of a turning operation. The delay time is set to a period longer than the period wherein the float 61 is held at the maximum swinging position by the centrifugal force at the time of turning. Accordingly, when a state in which the float 61 is inclined to the predetermined angle is continued for the predetermined time, it is judged that the vehicle body is inclined to the predetermined angle.

Next, the function of this embodiment is explained. As shown in FIGS. 1 and 3, the inclination angle sensor 25 is arranged on the cross member 51 arranged in front of the steering shaft 20 on the vehicle body center C. Further, the inclination angle sensor 25 is arranged in front of the steering shaft 20 and above the axis O of the front wheels 2 as viewed in a side view on the vehicle body center C. Thus, in the four-wheeled buggy in which a vehicle body does not bank at the time of turning, it is possible to arrange the inclination angle sensor 25 closer to the vicinity of the center of turning thus restricting an influence by the centrifugal force or the like at the time of operation as small as possible. Accordingly, it is possible to arrange the inclination angle sensor 25 at the most suitable position in the vehicle which adopts such a type. Thus, it is possible to prevent the inclination angle sensor 25 from misjudging the inclination of the vehicle body by the centrifugal force or the like thus enabling the favorable engine control.

Further, since the inclination angle sensor 25 is mounted on a conventionally existing cross member 51, the inclination angle sensor 25 can be arranged without requiring a change of other vehicle-body constitutional parts such as preparation of particular mounting parts or the like whereby the number of parts can be reduced. In addition, at the same time, the change of other vehicle-body parts becomes unnecessary. Further, since the cross member 51 supports an upper end of the front shock absorber 19, by mounting the inclination angle sensor 25 on the cross member 51, it is possible to arrange the inclination angle sensor 25 above the axis O of the front wheels 2 as viewed in a side view.

Further, even in the inclination angle sensor 25 which detects the inclination of the vehicle body in the lateral direction, when the vehicle is inclined in the longitudinal direction, the float 61 is allowed to swing in either of the left and the right directions. Accordingly, it is possible to detect the inclination of the vehicle body in the longitudinal direction. Thus, the engine control which can widely cope with the inclination of the vehicle body can be realized. Further, since the delay time is prepared for detection by the detection circuit 63, only when the state in which the swinging of the float 61 reaches the detection angle is continued for the predetermined time, it is detected that the inclination of the vehicle body is the predetermined angle. Accordingly, momentary swinging of the float 61 can be excluded as a noise thus further increasing the detection accuracy. Further, since the detection angle of this embodiment is set larger than the detection angle of a motorcycle, it is possible to further enhance the detection accuracy.

Further, the radiator 23, the reservoir tank 24 and the inclination angle sensor 25 are arranged in order from the front side of the vehicle body and, at the same time, the inclination angle sensor 25 is arranged such that the inclination angle sensor 25 is concealed by the back surface of the reservoir tank 24 as viewed in a front view. Thus, it is possible to prevent the exhaust heat of the radiator 23 from directly reaching the inclination angle sensor 25 thus preventing the inclination angle sensor 25 from receiving thermal damage by the radiator 23. Accordingly, this construction can also contribute to enhancing the detection accuracy by the inclination angle sensor 25.

The present invention is not limited to the above-mentioned embodiment and various modifications can be made. For example, it is not always necessary to prepare the mounting position of the inclination angle sensor 25 on the cross member 51, so long as the mounting position of the inclination angle sensor 25 is arranged in front of and in the vicinity of the steering shaft 20. Further, the inclination angle sensor 25 may be offset to one side of the vehicle body instead of being arranged on the vehicle body center.

Further, the structure of the inclination angle sensor 25 is also not limited to the structure of this embodiment. A conventional structure may be utilized. Further, a vehicle to which the present invention is applicable can be various types of vehicles as long as the vehicle is provided with at least three wheels and does not bank at the time of turning.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An arrangement structure of an inclination angle sensor mounted on a four-wheeled buggy for traveling on irregular ground which includes a frame, four wheels with balloon tires which are supported on the frame, and a steering shaft which is connected to a steering handle, the arrangement comprising:
    an inclination angle sensor,
    said inclination angle sensor being arranged in front of the steering shaft above and in a vicinity of an axis of the front wheels and behind an upper portion of a radiator,
    wherein the frame of the buggy includes:
    a cross member extending between intermediate portions of left and right front down frames,
    wherein the cross member is adapted to support the inclination angle sensor on a lower central portion thereof.

2. The arrangement structure of an inclination angle sensor according to claim 1, wherein the inclination angle sensor is positioned behind the axis of the front wheels.

3. The arrangement structure of an inclination angle sensor according to claim 2, wherein the inclination angle sensor is arranged behind the radiator in a spaced-apart manner.

4. The arrangement structure of an inclination angle sensor according to claim 2, wherein an electric wire is connected to an upper portion of the inclination angle sensor.

5. The arrangement structure of an inclination angle sensor according to claim 1, wherein the inclination angle sensor is arranged behind the radiator in a spaced-apart manner.

6. The arrangement structure of an inclination angle sensor according to claim 1, wherein an electric wire is connected to an upper portion of the inclination angle sensor.

7. The arrangement structure of an inclination angle sensor according to claim 1, further comprising a pair of front shock absorbers having upper end portions supported on the cross member.

8. The arrangement structure of an inclination angle sensor according to claim 1, wherein the buggy includes a fuel tank mounted behind the steering shaft and the front wheels, so that when the buggy is viewed in side elevation view, the inclination angle sensor is seen to be mounted behind the axis of the front wheels and forward of the fuel tank.

9. The arrangement structure of an inclination angle sensor according to claim 1, further comprising left and right reinforcing pipes extending downwardly and rearwardly from the intermediate portions of the left and right front down frames.

10. The arrangement structure of an inclination angle sensor according to claim 1, wherein the steering shaft has a lower end mounted on a bracket connected to left and right lower frames of the buggy.

11. An arrangement structure of an inclination angle sensor mounted on a four-wheeled buggy for traveling on irregular ground which includes a frame, four wheels with balloon tires which are supported on the frame, and a steering shaft which is connected to a steering handle, the arrangement comprising:
    an inclination angle sensor, said inclination angle sensor being arranged in front of the steering shaft above and in a vicinity of an axis of the front wheels and behind an upper portion of a radiator,
    wherein the inclination angle sensor is provided with a swinging shaft located parallel to and directly above a centerline C of the buggy, and a pendulum float pivotally mounted on a swinging shaft,
    wherein the frame of the buggy includes:
    a cross member extending between intermediate portions of left and right front down frames,
    wherein the cross member is adapted to support the inclination angle sensor on a lower central portion thereof.

12. The arrangement structure of an inclination angle sensor according to claim 11, wherein the cross member is adapted to support upper end portions of left and right front shock absorbers on left and right ends thereof.

13. The arrangement structure of an inclination angle sensor according to claim 11, wherein the buggy includes a fuel tank mounted behind the steering shaft and the front wheels, so that when the buggy is viewed in side elevation view, the inclination angle sensor is seen to be mounted behind the axis of the front wheels and forward of the fuel tank.

14. The arrangement structure of an inclination angle sensor according to claim 11, further comprising left and right reinforcing pipes extending downwardly and rearwardly from the intermediate portions of the left and right front down frames.

15. The arrangement structure of an inclination angle sensor according to claim 11, wherein the steering shaft has a lower end mounted on a bracket connected to left and right lower frames of the buggy.

16. An arrangement structure of an inclination angle sensor mounted on a four-wheeled buggy for traveling on irregular ground which includes four wheels with balloon tires which are supported on a frame, the frame having a pair of upper frames and a pair of upper brackets for attaching a steering shaft to the upper frames, the arrangement comprising:

an inclination angle sensor arranged in a position forward of the steering shaft, the position being below and forward of where the upper brackets attach the steering shaft to the upper frames, and above and in a vicinity of an axis of the front wheels and behind an upper portion of a radiator, wherein the frame of the buggy includes:

a cross member extending between intermediate portions of left and right front down frames, wherein the cross member is adapted to support the inclination angle sensor on a lower central portion thereof.

17. The arrangement structure of an inclination angle sensor according to claim 16, where the cross member is adapted to support upper end portions of left and right front shock absorbers on left and right ends thereof.

18. The arrangement structure of an inclination angle sensor according to claim 16, wherein the buggy includes a fuel tank mounted behind the steering shaft and the front wheels, so that when the buggy is viewed in side elevation view, the inclination angle sensor is seen to be mounted behind the axis of the front wheels and forward of the fuel tank.

19. The arrangement structure of an inclination angle sensor according to claim 16, further comprising left and right reinforcing pipes extending downwardly and rearwardly from the intermediate portions of the left and right front down frames.

20. The arrangement structure of an inclination angle sensor according to claim 16, wherein the steering shaft has a lower end mounted on a bracket connected to left and right lower frames of the buggy.

* * * * *